(12) United States Patent
Shimizu

(10) Patent No.: US 10,148,538 B2
(45) Date of Patent: Dec. 4, 2018

(54) DISTRIBUTED CONTROLLERS

(71) Applicant: FUJITSU LIMITED, Kawasaki-shi, Kanagawa (JP)

(72) Inventor: Sho Shimizu, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 378 days.

(21) Appl. No.: 15/003,767

(22) Filed: Jan. 21, 2016

(65) Prior Publication Data
US 2017/0214593 A1    Jul. 27, 2017

(51) Int. Cl.
G06F 15/173    (2006.01)
H04L 12/26    (2006.01)
G06F 9/4401    (2018.01)

(52) U.S. Cl.
CPC ......... H04L 43/0852 (2013.01); G06F 9/442 (2013.01); H04L 43/062 (2013.01); H04L 43/0864 (2013.01); H04L 43/10 (2013.01); H04L 43/16 (2013.01)

(58) Field of Classification Search
CPC .............. H04L 43/0852; H04L 43/062; H04L 43/0864; H04L 43/10; H04L 43/16; G06F 9/442
See application file for complete search history.

(56) References Cited

U.S. PATENT DOCUMENTS

| 5,978,567 | A | * | 11/1999 | Rebane | ................... | H04L 29/06 348/E5.008 |
| 8,189,487 | B1 | * | 5/2012 | Mateski | ................... | H04L 69/22 370/242 |
| 8,830,823 | B2 | | 9/2014 | Koponen et al. | | |
| 8,849,897 | B2 | * | 9/2014 | Ortal | ................... | G06F 9/4445 709/203 |
| 2008/0301316 | A1 | * | 12/2008 | Alpern | ................... | G06F 9/4843 709/231 |
| 2013/0039208 | A1 | * | 2/2013 | Jonsson | ............... | H04L 41/0816 370/252 |
| 2014/0258533 | A1 | * | 9/2014 | Antony | ............. | H04L 29/08144 709/226 |
| 2014/0281008 | A1 | * | 9/2014 | Muthiah | ............. | H04L 29/0651 709/231 |
| 2016/0234092 | A1 | * | 8/2016 | Avery | ...................... | H04L 43/16 |
| 2016/0234099 | A1 | * | 8/2016 | Jiao | ........................ | H04L 45/02 |

(Continued)

OTHER PUBLICATIONS

Koponen et al. "Onix: A Distributed Control Platform for Large-Scale Production Networks", Operating Systems Design and Implementation (OSDI), pp. 1-6, Oct. 2010.

(Continued)

*Primary Examiner* — Jonathan A Bui
(74) *Attorney, Agent, or Firm* — Maschoff Brennan

(57) ABSTRACT

The present disclosure may include a method that includes determining latency between a client system and a service provider system. The client system may include a network element and a client computing device and the service provider system may include a controller program configured to provide controller services to the network element of the client system. The method may also include, based on the latency being longer than a threshold, transmitting the controller program to the client computing device to be executed by the client computing device so that the client computing device provides controller services to the network element of the client system.

8 Claims, 7 Drawing Sheets

(56) References Cited

U.S. PATENT DOCUMENTS

2016/0381699 A1* 12/2016 Rubin ................. H04L 67/2809
                                                            370/329
2017/0123860 A1*  5/2017 Chakra ................. G06F 9/5094
2017/0163765 A1*  6/2017 Kataria ............ G06Q 10/06312

OTHER PUBLICATIONS

Lantz et al. "ONOS: Towards an Open, Distributed SDN OS", Hot Topics in Software Defined Networking, Aug. 22, 2014.

* cited by examiner

DISTRIBUTED CONTROLLERS

FIELD

The embodiments discussed in the present disclosure are related to systems including distributed controllers.

BACKGROUND

Controllers may provide services to network elements to facilitate the formation and operation of networks. A single centralized controller for a network may place limits on the network.

The subject matter claimed herein is not limited to embodiments that solve any disadvantages or that operate only in environments such as those described above. Rather, the Background is provided to illustrate one exemplary technology area where embodiments of the present disclosure described herein may be practiced.

SUMMARY

In one or more embodiments, the present disclosure may include a method that includes determining latency between a client system and a service provider system. The client system may include a network element and a client computing device and the service provider system may include a controller program configured to provide controller services to the network element of the client system. The method may also include, based on the latency being longer than a threshold, transmitting the controller program to the client computing device to be executed by the client computing device so that the client computing device provides controller services to the network element of the client system.

The object and advantages of the embodiments will be realized and achieved at least by the elements, features, and combinations particularly pointed out in the claims.

Both the foregoing general description and the following detailed description provide examples and are explanatory and are not restrictive.

BRIEF DESCRIPTION OF THE DRAWINGS

Example embodiments will be described and explained with additional specificity and detail through the use of the accompanying drawings in which.

DESCRIPTION

The present disclosure relates to systems that may utilize distributed controllers, for example, software-defined networking (SDN) systems. In some embodiments, the systems may include a service provider system and a client system. The service provider system may be configured to provide controller services to the client system.

In some embodiments, the service provider system may include controllers configured to provide controller services to network elements of the client system. In some embodiments, the controller services may function as a control plane between the network elements of the client system and applications operating within the client system. Based on a triggering event (e.g., latency between the client system and the service provider system exceeding a threshold, or a load of the service provider system exceeding a threshold), a controller program, previously operated by the controllers, may be sent from the service provider system to the client system. In these and other embodiments, the controller program may be provided to and operated by a client computing device.

Operating the controller program at the client computing device may reduce latency between the controller program and the network elements of the client system. Furthermore, the client computing device operating the controller program may off-load some of the load of providing controller services from the service provider system to the client system.

Embodiments of the present disclosure are explained with reference to the accompanying drawings.

Figure 1:
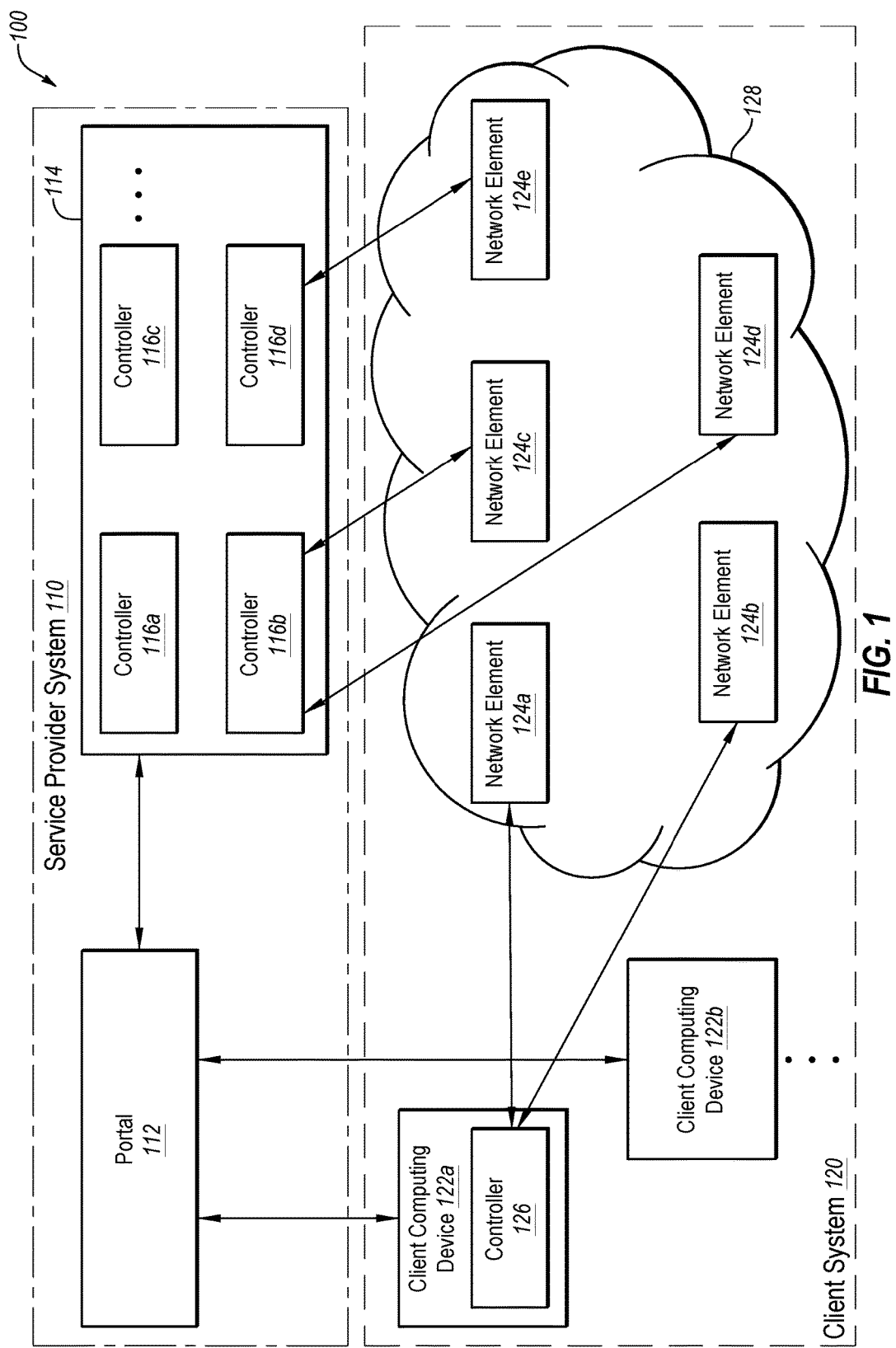
FIG. 1 is a block diagram of an example system with distributed controllers.

FIG. 1 is a block diagram of an example system 100 with distributed controllers, in accordance with at least one embodiment of the present disclosure. The system 100 may include a service provider system 110 (illustrated by a dashed and dotted line) and a client system 120 (illustrated by a dashed line). The client system 120 may have a contract for, agreement for, arrangement for, or otherwise receive controller services from the service provider system 110. For example, the client system may have one or more network elements 124 (e.g., a network element 124a, a network element 124b, a network element 124c, a network element 124d, and a network element 124e) that may operate to provide a network 128. One or more of the network elements 124 may be provided controller services by one or more controllers 116 (e.g., a controller 116a, a controller 116b, a controller 116c, and a controller 116d) of the service provider system 110. Controller services may include any of flow control management, control plane operation, directing network elements regarding packet transmission, network path optimization, interfacing between network resources and applications, monitor network status and statistics, manage network hardware functionality and capabilities, reporting failures to applications/clients, etc. In some embodiments, one or more of the controllers 116 may be SDN controllers. In these and other embodiments, the controller services provided by the controllers 116 may be provided using one or more protocols associated with SDN controllers and systems, such as the OPENFLOW® protocol.

The service provider system 110 may include a portal 112 by which the client system 120 may interact with the service provider system 110. The service provider system 110 may also include a controller pool 114 that may include the controllers 116 (e.g., the controllers 116a-116d).

The client system 120 may include one or more computing devices 122 (e.g., a client computing device 122a and a client computing device 122b). As described above, the client system 120 may also include the network 128 implemented by the network elements 124.

In some embodiments, the service provider system 110 may request, transmit, or otherwise cause one of the computing devices 122 in the client system 120 (e.g., the client computing device 122a) to receive and implement a controller program (e.g., the controller program 126). The controller program 126 may perform a similar or identical function to the controllers 116. For example, the controller program 126 may provide controller services to one or more of the network elements 124 of the client system 120. In some embodiments, the controller program 126 may replace one or more of the controllers 116 and/or may supplement the controller services of one or more of the controllers 116.

In some embodiments, the client computing device 122a may implement the controller program 126 based on an occurrence of one or more events. An event causing the service provider system 110 to request, transmit, or otherwise cause one of the computing devices 122 to receive and implement a controller program may be referred to as a triggering event.

Various examples of triggering events follow. For example, a triggering event may include if latency between the service provider system 110 and the client system 120 exceeds a threshold (e.g., latency as described with respect to FIG. 2), the controller program 126 may be run by the client computing device 122a. Such a threshold may be based on performance guarantees set by the client or the service provider, such as a minimum ping response time. For example, a client or provider may set a minimum ping response at ten milliseconds, fifty milliseconds, one hundred milliseconds, two hundred milliseconds, five hundred milliseconds, nine hundred milliseconds, etc. In some embodiments, a minimum ping response may be between one hundred and one thousand milliseconds. Another example of a triggering event may be if a load of the pool of controllers 114 exceeds a threshold, the controller program 126 may be run by the client computing device 122a. Such a threshold may be based on computational resource load or controller load set by the client or the service provider, such as a maximum ratio of network elements to controllers or a minimum number of processor cycles per unit time for a controller program. For example, in some embodiments a threshold may include eighty percent of total processor utilization on the controller or eighty percent of the total memory utilization on the controller. AS another example, in some embodiments a threshold may include fifty percent of processor utilization consumed by the controller program or fifty percent of memory utilization by the controller program. An additional example of a triggering event may be if the client system 120 requests additional controller services (e.g., if the network 128 adds additional network elements 124), the controller program 126 may be run by the client computing device 122a.

As illustrated in FIG. 1, one or more of the network elements 124 may be provided controller services by the controllers 116 in the controller pool 114. For example, the network elements 124c and 124d may receive controller services from the controller 116b and the network element 124e may receive controller services from the controller 116d. Additionally or alternatively, one or more of the network elements 124 may be provided controller services by the controller program 126 operating on the client computing device 122a of the client system 120. In these and other embodiments, the controller program 126 may be operated based on a request, transmission, or other action taken by the service provider system 110 to cause the client computing device 122a to operate the controller program 126.

The service provider system 110 may include any number of systems, devices, components, or combinations thereof configured to provide services to the client system 120. For example, the service provider system 110 may be a third party providing SDN implementation to the client system 120. As another example, the service provider system 110 may provide controller services to the client system 120.

The portal 112 may include any number of systems, devices, components, or combinations thereof configured to provide communication between the service provider system 110 and the client system 120. For example, the portal 112 may allow the client system 120 to request services and/or updates from the service provider system 110 and/or manage the configuration of the services provided to the client system 120 by the service provider system 110. In some embodiments, the client system 120 may start, stop, renew, or otherwise manage the services, contracts, or subscriptions the client system 120 requests or receives from the service provider system 110.

Figure 2:
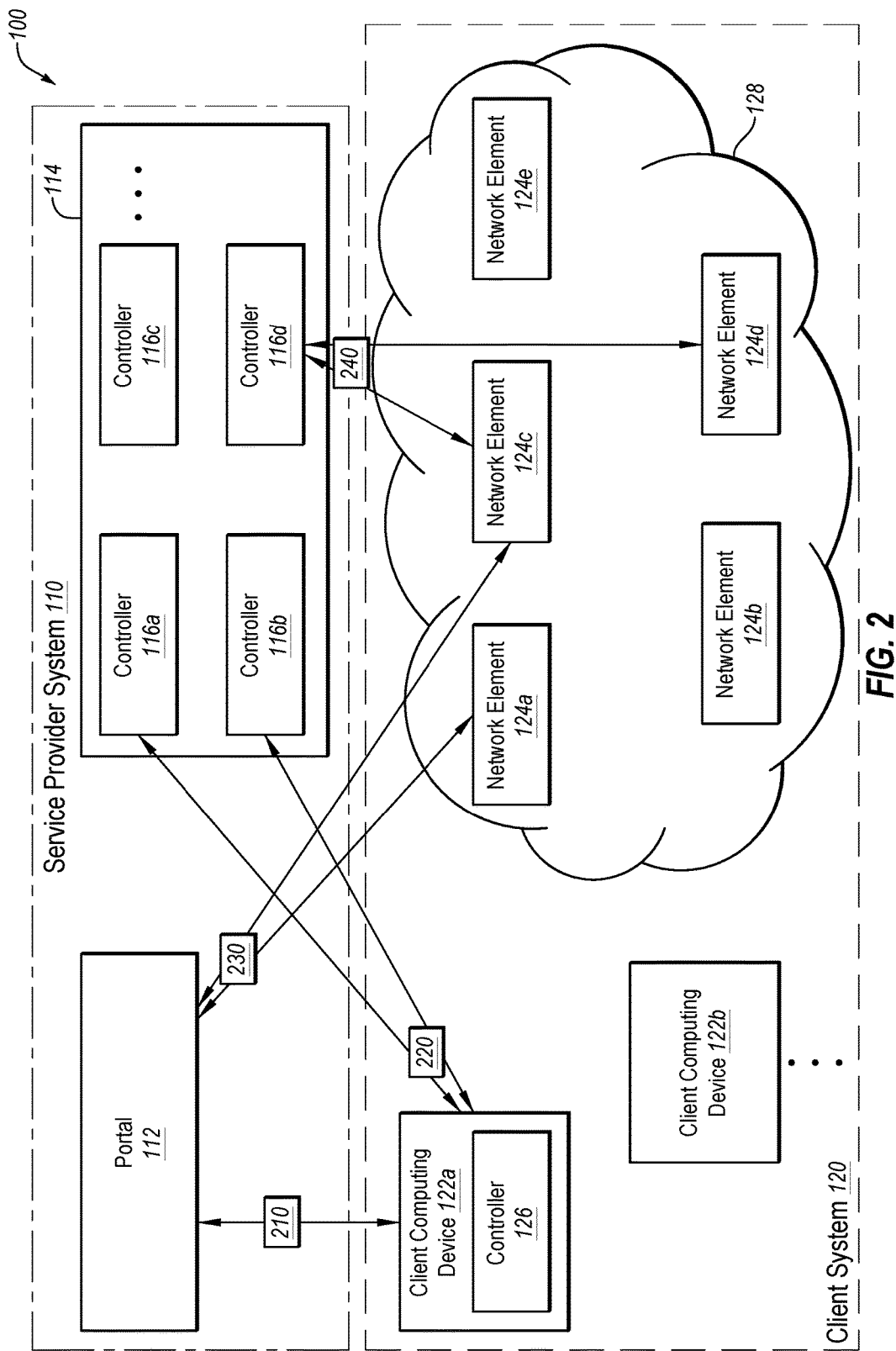
FIG. 2 is a block diagram illustrating various connections of an example system with distributed controllers.
Figure 3:
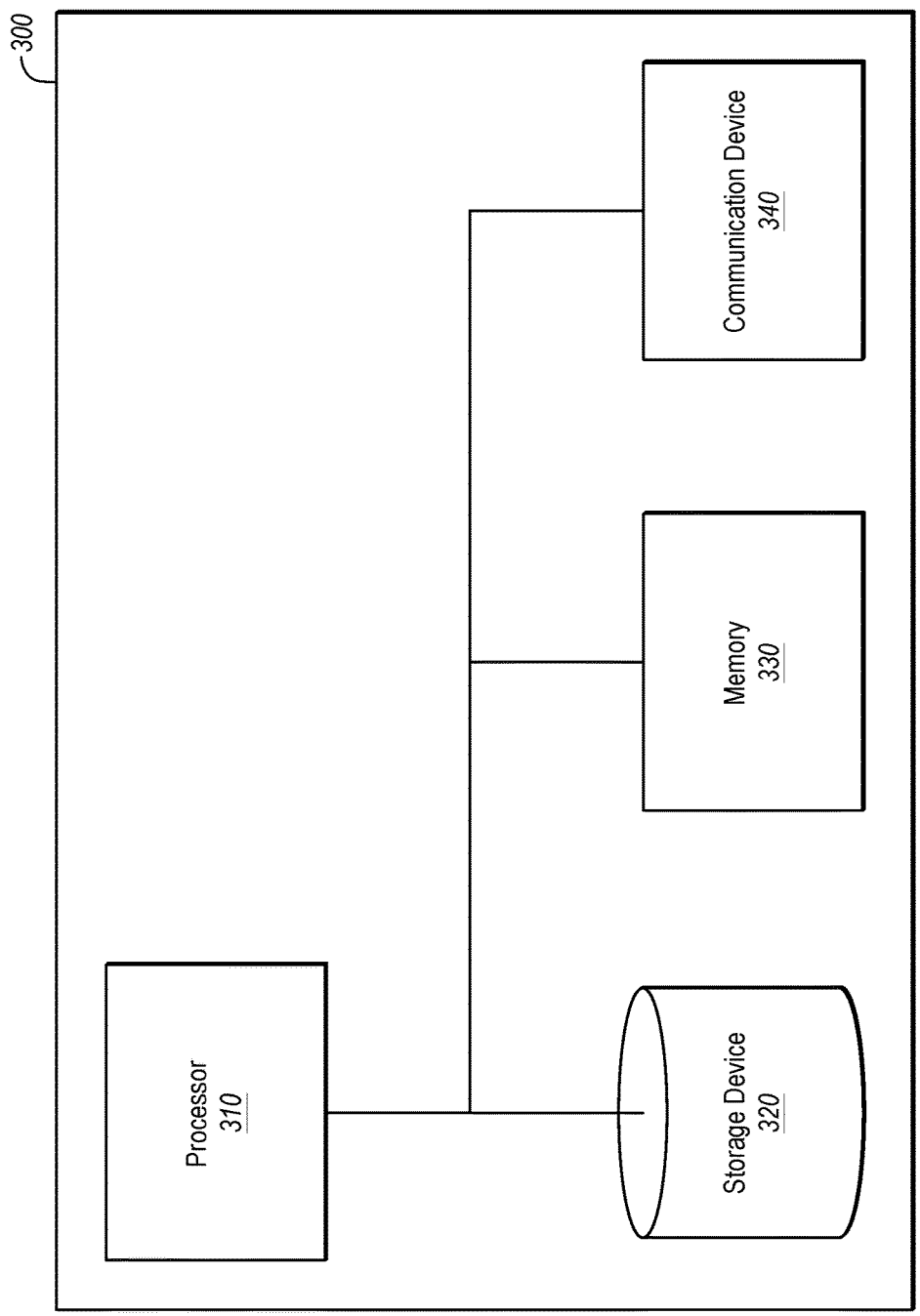
FIG. 3 is a block diagram of an example computing device.

In some embodiments, the portal 112 may be configured to determine a latency between the service provider system 110 and the client system 120 and/or the load of the controller pool 114 and/or the client computing devices 122 (e.g., the latency as described with respect to FIG. 2). Additionally or alternatively, the portal 112 may transmit, request, or otherwise cause one or more of the computing devices 122 of the client system 120 to operate or otherwise receive the controller program 126. In some embodiments, the portal 112 may include a web portal. In these and other embodiments, the web portal may include a system or device that may interface with the Internet such that a user of the client system 120 may access the portal 112 via the Internet. In some embodiments, the portal 112 may be implemented as a computing device, for example, as a computing device as illustrated in FIG. 3.

The controller pool 114 of the controllers 116 may include any number of systems, devices, components, or combinations thereof configured to provide controller services to one or more network elements (e.g., the network elements 124 of the client system 120). In some embodiments, the controller pool 114 may be implemented as a data center, group of servers, or other collection of physical computing devices. In some embodiments, the controller pool 114 may include virtualization software such that the controllers 116 may include virtualized instances of controllers. The controller pool 114 may be implemented as one or more computing devices, such as the computing device 300 illustrated in FIG. 3. In some embodiments, the controllers 116 may be implemented as controller programs, for example, virtualized controllers or software programs providing controller services. In some embodiments, the controllers 116 may be implemented as physical controllers within the controller pool 114. For example, the controller 116a may be one computing device, the controller 116b may be another computing device, the controller 116c may be another computing device, and the controller 116d may be another computing device (e.g., the computing device 300 illustrated in FIG. 3).

In some embodiments, there may be a network (not illustrated) between the service provider system 110 and the client system 120. By way of example, the network may include one or more wide area networks (WANs) and/or local area networks (LANs) that enable the service provider system 110 and the client system 120 to be in communication. In some embodiments, the network may include the Internet, including a global internetwork formed by logical and physical connections between multiple WANs and/or LANs. Alternately or additionally, the network may include one or more cellular RF networks and/or one or more wired and/or wireless networks such as, but not limited to, 802.xx networks, Bluetooth access points, wireless access points, IP-based networks, or the like. The network may also include servers that enable one type of network to interface with another type of network. Additionally or alternatively, the network may include an Intranet, or one or more computing devices in communication within an organization or an in otherwise secure manner. The network 128 of the client system 120 may be part of or a portion of the network providing communication between the service provider system 110 and the client system 120. Additionally or alternatively, the network 128 may be implemented in a similar manner to the network providing communication between the client system 120 and the service provider system 110. In some embodiments, the network 128 may be serviced and/or deployed by the network elements 124.

The client computing devices 122 (e.g., the client computing device 122a and the client computing device 122b) may include any number of systems, devices, components, or combinations thereof configured to operate within the client system 120. For example, the client computing devices 122 may include a variety of laptops, servers, workstations, mobile devices, etc. connecting through a company intranet (e.g., the network 128). The client computing devices 122 may also include devices that may provide administrative services to the client system 120 without being connected to the network 128. For example, an administrator of the client system may manage or otherwise control the client system 120 remotely from the network 128. In some embodiments, some or all of the client computing devices 122 may be capable of running the controller program 126. For example, while illustrated as operating on the client computing device 122a, the client computing device 122b may also be capable of running the controller program 126.

The network elements 124 (e.g., the network element 124a, the network element 124b, the network element 124c, the network element 124d, and the network element 124e) may include any device, system, component, or collection of components configured to receive, handle, and/or process packets within the network 128. The network elements 124 may each be implemented as a router, a gateway, a switch, or any other network element. In some embodiments, the network elements 124 may be implemented as a computing device such as the computing device 300 illustrated in FIG. 3.

In some embodiments, the portal 112 may monitor for a triggering event that may trigger the implementation of the controller program 126 on the client computing device 122a. For example, a triggering event may include latency between the client system 120 and the service provider system 110 exceeding a threshold, or a load of the controller pool 14 exceeding a threshold. As another example, a triggering event may include the client computing device 122a requesting additional controller services from the portal 112. In these and other embodiments, a load of one or more of the client computing devices 122, and/or a load of the client computing devices 122 when operating the controller program 126 may be a factor in determining whether to implement the controller program 126 at the client system 120. For example, if the client computing device 122a was utilizing a high percentage of computing resources of the client computing device 122a and the client computing device 122b was utilizing a lower percentage of computing resources of the client computing device 122b, the controller program 126 may be transmitted to the client computing device 122b instead of the client computing device 122a. Additionally or alternatively, the controller program 126 may be transmitted from the portal 112 to both the client computing device 122a and the client computing device 122b and only one of the client computing device 122a and the client computing device 122b may be requested by the portal 112 to run the controller program 126.

Modifications, additions, or omissions may be made to FIG. 1 without departing from the scope of the present disclosure. For example, the system 100 may include more or fewer elements than those illustrated and described in the present disclosure. For example, the system 100 may include any number of controllers 116 in the controller pool 114, any number of client computing devices 122, and any number of network elements 124. As another example, while some double arrows of communication are illustrated, there may be other interconnections and components in communication not explicitly illustrated. As an additional example, there may be any number of client systems 120 receiving controller services from the service provider system 110, and/or the client system 120 may utilize controller services from any number of service provider systems 110.

FIG. 2 is a block diagram illustrating various connections of an example system 100 with distributed controllers, in accordance with at least one embodiment of the present disclosure. The system 100 of FIG. 2 may be identical or analogous to the system 100 of FIG. 1. FIG. 2 may illustrate various connections that may be monitored for latency, illustrating various embodiments of measuring latency between the service provider system 110 and the client system 120.

In some embodiments, latency between the service provider system 110 and the client system 120 may be measured by measuring latency along a first connection 210 between the portal 112 and the client computing device 122a. For example, the service provider system 110 may monitor the latency between the client computing device 122a and the portal 112 by sending a ping or other round-trip-request directly from the portal 112 to the client computing device 122a along the first connection 210. As another example, the client computing device 122a may request the latency by sending a ping or other round-trip request from the client computing device 122a to the portal 112.

In some embodiments, latency between the service provider system 110 and the client system 120 may be measured by measuring latency along a second connection 220 between one or more of the controllers 116 (e.g., 116a and 116b) and the client computing device 122a. For example, the service provider system 110 may monitor the latency along the second connection 220 by the portal 112 requesting the controllers 116 to send a ping or other round-trip-request from the controllers 116 to the client computing device 122a along the second connection 220 and the controllers 116 reporting the result to the portal 112. As another example, the client computing device 122a may request the latency by sending a ping or other round-trip request from the client computing device 122a to one or more of the controllers 116.

In some embodiments, latency between the service provider system 110 and the client system 120 may be measured by measuring latency along a third connection 230 between the portal 112 and one or more of the network elements 124 (e.g., the network elements 124a and 124c). For example, the service provider system 110 may monitor the latency along the third connection 230 by the portal 112 sending a ping or other round-trip-request from the portal 112 to the network elements 124 along the third connection 230. As another example, the client computing device 122a may request the latency by directing the network elements 124 to send a ping or other round-trip request from the network elements 124 to the portal 112 and to report the result to the client computing device 122a and/or the portal 112. In these and other embodiments, the client system 120 may provide the portal 112 the IP address or other identifying information for the network elements 124 such that the portal 112 may send the latency measuring request.

In some embodiments, latency between the service provider system 110 and the client system 120 may be measured by measuring latency along a fourth connection 240 between one or more of the controllers 116 (e.g., the controller 116d) and one or more of the network elements 124 (e.g., the network elements 124c and 124d). For example, the service provider system 110 may monitor the latency along the fourth connection 240 by the portal 112 requesting the controllers 116 to send a ping or other round-trip-request from the controllers 116 to the network elements 124 along the fourth connection 240 and the controllers 116 reporting the result to the portal 112. As another example, the client computing device 122a may request the latency by directing the network elements 124 to send a ping or other round-trip request from the network elements 124 to the controllers 116 and to report the result to the client computing device 122a and/or the portal 112. In these and other embodiments, the client system 120 may provide the portal 112 with the IP address or other identifying information for the network elements 124, and the portal 112 may provide that information to the controllers 116 such that the controllers 116 may send the latency measuring request.

Modifications, additions, or omissions may be made to FIG. 2 without departing from the scope of the present disclosure. For example, the system 100 may include more or fewer elements than those illustrated and described in the present disclosure. As another example, while described as measuring latency using ping or other round-trip request, any other mechanism, process, or features for measuring latency along the various connections is contemplated within the scope of the present disclosure. Additionally, while examples of connections are illustrated, any number of connections may be simultaneously, separately, or otherwise, monitored or measured.

FIG. 3 is a block diagram of an example computing device 300, in accordance with at least one embodiment of the present disclosure. Any of the service provider system 110, the portal 112, the pool of controllers 114, the controllers 116, the client system 120, the client computing devices 122, and/or the network elements 124 may be implemented as the computing device 300. The computing device 300 may include a desktop computer, a laptop computer, a server computer, a tablet computer, a mobile phone, a smartphone, a personal digital assistant (PDA), wearable technology (e.g., a smart watch), an e-reader device, a network switch, a network router, a network hub, other networking devices, or other suitable computing device.

The computing device 300 may include a processor 310, a storage device 320, a memory 330, and a communication component 340. The processor 310, the storage device 320, the memory 330, and/or the communication component 340 may all be communicatively coupled such that each of the components may communicate with the other components. The computing device 300 may perform any of the operations described in the present disclosure.

In general, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, the processor 310 may include any number of processors configured to perform, individually or collectively, any number of operations described in the present disclosure.

In some embodiments, the processor 310 may interpret and/or execute program instructions and/or process data stored in the storage device 320, the memory 330, or the storage device 320 and the memory 330. In some embodiments, the processor 310 may fetch program instructions from the storage device 320 and load the program instructions in the memory 330. After the program instructions are loaded into memory 330, the processor 310 may execute the program instructions.

For example, in some embodiments one or more of the controllers 116 and/or the controller program 126 of FIG. 1 may be included in the data storage 320 as program instructions. The processor 310 may fetch the program instructions of one or more of the controllers 116 and/or the controller program 126 and may load the program instructions of the controllers 116 and/or the controller program 126 in the memory 330. After the program instructions of the controllers 116 and/or the controller program 126 are loaded into the memory 330, the processor 310 may execute the program instructions such that the computing device 300 may implement the operations associated with the controllers 116 and/or the controller program 126 as directed by the program instructions.

The storage device 320 and the memory 330 may include computer-readable storage media for carrying or having computer-executable instructions or data structures stored thereon. Such computer-readable storage media may include any available media that may be accessed by a general-purpose or special-purpose computer, such as the processor 310. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 310 to perform a certain operation or group of operations.

The communication component 340 may include any device, system, component, or collection of components configured to allow or facilitate communication between the computing device 300 and a network (e.g., the network 128 of FIG. 1 or the network allowing communication between the service provider system 110 and the client system 120 of FIG. 1) For example, the communication component 340 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. The communication component 340 may permit data to be exchanged with any network (including the network 128) such as a cellular network, a Wi-Fi network, a MAN, an optical network, etc., to name a few examples, and/or any other devices described in the present disclosure, including remote devices.

Modifications, additions, or omissions may be made to FIG. 3 without departing from the scope of the present disclosure. For example, the computing device 300 may include more or fewer elements than those illustrated and described in the present disclosure. For example, the computing device 300 may include an integrated display device such as a screen of a tablet or mobile phone or may include an external monitor, a projector, a television, or other suitable display device that may be separate from and communicatively coupled to the computing device 300.

Figure 4:
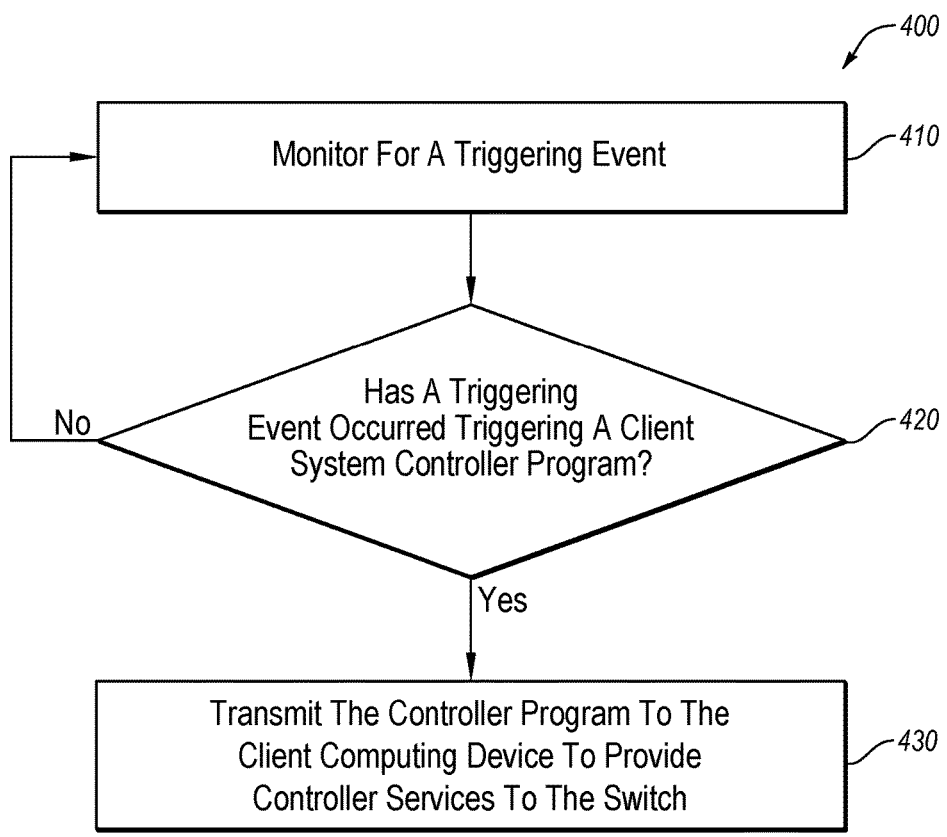
FIG. 4 is a flow chart of an example method utilizing distributed controllers.

FIG. 4 is a flow chart of an example method 400 utilizing distributed controllers, in accordance with at least one embodiment of the present disclosure. The method 400 may be performed by any suitable system, apparatus, or device. For example, the system 100 of FIG. 1 and/or the computing device 300 of FIG. 3 may perform one or more of the operations associated with the method 400. Although illustrated with discrete blocks, the steps and operations associated with one or more of the blocks of the method 400 may be divided into additional blocks, combined into fewer blocks, or eliminated, depending on the desired implementation.

At block 410, a triggering event may be monitored for. For example, a service provider system (e.g., the service provider system 110 of FIG. 1) may monitor for a triggering event. Such a triggering event may include latency between the service provider system and a client system (e.g., the client system 120 of FIG. 1) exceeding a threshold, a load on a pool of controllers (e.g., the pool of controllers 114 of FIG. 1) exceeding a threshold, the client system requesting additional controller services, etc.

At block 420, a determination may be made as to whether a triggering event has occurred that triggers a client system controller program. If a triggering event has occurred, the method 400 may proceed to block 430. If a triggering event has not occurred, the method 400 may return to block 410 to continue to monitor for a triggering event.

At block 430, a controller program (e.g., the controller program 126 of FIG. 1) may be transmitted from the service provider system to a client computing device (e.g., the client computing device 122a of FIG. 1) of the client system, to be executed on the client computing device 122a so the client computing device 122a may provide controller services to a network element (e.g., the network element 124 of FIG. 1) of the client system. For example, a portal (e.g., the portal 112 of FIG. 1) of the service provider system may transmit a controller program to the client computing device of the client system such that the client computing device may execute the controller program.

Accordingly, the method 400 may utilize distributed controllers. Modifications, additions, or omissions may be made to the method 400 without departing from the scope of the present disclosure. For example, the operations of the method 400 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 5:
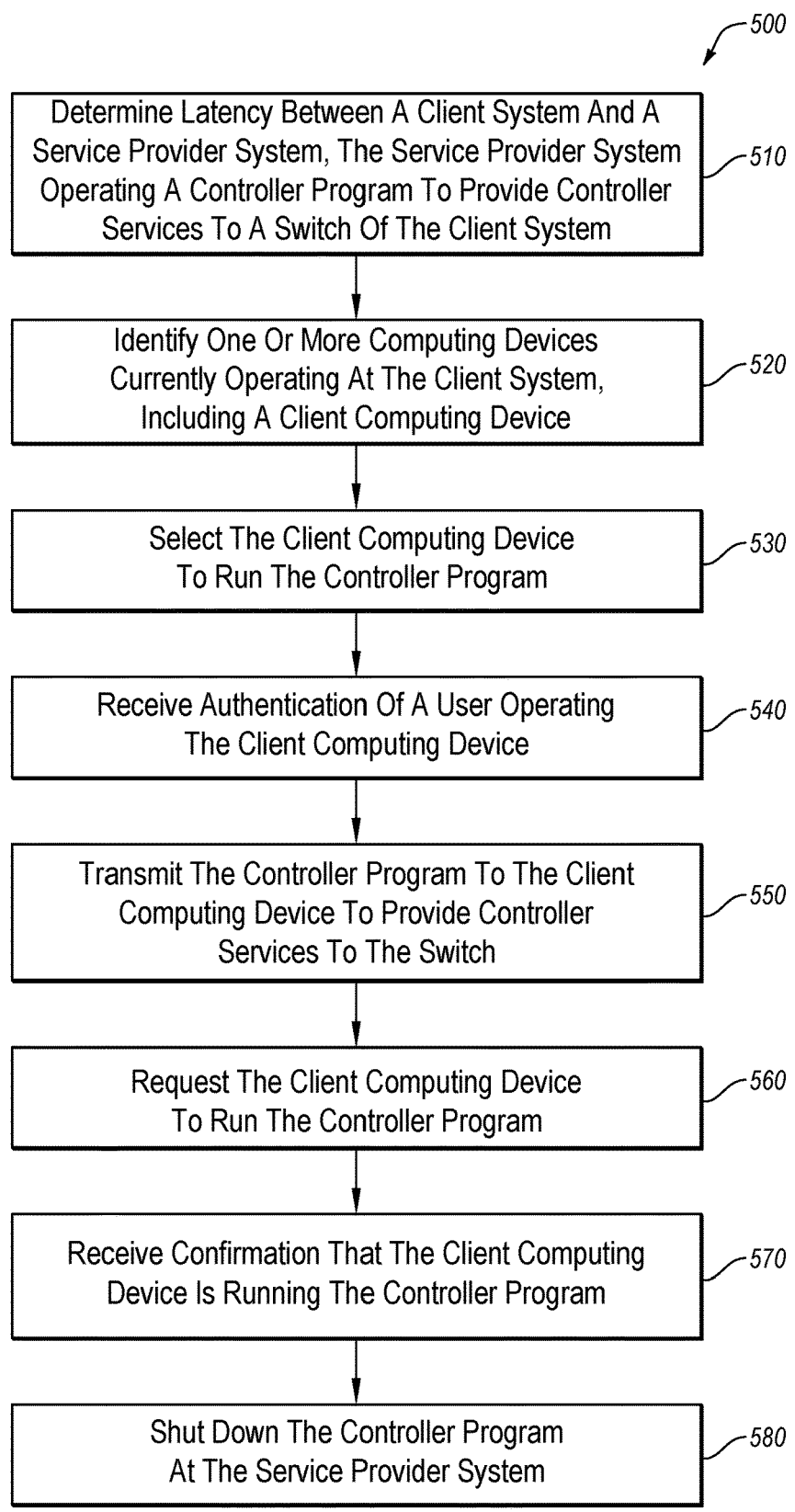
FIG. 5 is a flow chart of another example method utilizing distributed controllers.

FIG. 5 is a flow chart of another example method 500 utilizing distributed controllers, in accordance with at least one embodiment of the present disclosure. The method 500 may be performed by any suitable system, apparatus, or device. For example, the system 100 of FIG. 1 and/or the computing device 300 of FIG. 3 may perform one or more of the operations associated with the method 500. Although illustrated with discrete blocks, the steps and operations associated with one or more of the blocks of the method 500 may be divided into additional blocks, combined into fewer blocks, or eliminated, depending on the desired implementation.

At block 510, latency between a client system and a service provider system (e.g., the client system 120 and the service provider system 110 of FIG. 1) may be determined. For example, the latency may be determined along any of the connections described with respect to FIG. 2. In some embodiments, the service provider system may be operating a controller program (e.g., the controller 116a of FIG. 1) to provider controller services to a network element (e.g., the network element 124a of FIG. 1) of the client system. In some embodiments, determining latency may include comparing the latency to a threshold and determining if the latency exceeds the threshold.

At block 520, one or more of the computing devices (e.g., the computing devices 122a and/or 122b of FIG. 1) currently operating at the client system may be identified, including a client computing device. For example, a portal (e.g., the portal 112 of FIG. 1) may identify computing devices of the client system that may have sufficient computing capabilities to operate a controller program and that are currently operating at the client system. As another example, the portal may identify the computing device by which a user of the client system is making a request of the service provider system. In some embodiments, the one or more computing devices may be identified in response to the latency determined at block 510 exceeding a threshold At block 530, the client computing device may be selected from the computing devices identified at the block 520 to run the controller program. For example, the portal may identify the client computing device as including sufficient computing capabilities to run the controller program and may select the client computing device.

At block 540, the service provider system may receive authentication of a user operating the client computing device. For example, the service provider system may request that a user of the client system (e.g., a system administrator, power user, etc.) provide authentication via a password, credentials, fingerprint, etc., or any other authentication mechanism. In some embodiments, the authentication may be provided based on a request from the service provider system.

At block 550, the service provider system may transmit the controller program from the service provider system to the client computing device. Providing the controller program to the client computing device may allow the client computing device to provide controller services to the network element of the client system. For example, the service provider may send an executable file of the controller program to the client computing device and the client computing device may execute the executable file. Additionally or alternatively, the service provider system may suspend, or otherwise take a snapshot of a controller program operating on the service provider system and may provide that snapshot in lieu of or coupled with the executable file. For example, the physical memory location implementing the controller program at the service provider system may be suspended, copied, and transmitted to the client system. In some embodiments, the controller program may be transmitted to all of the computing devices identified at the block 520.

At block 560, the service provider system may request that the client computing device run the controller program. For example, if the controller program was transmitted from the service provider system to multiple computing devices, only the client computing device may be requested to execute the controller program. In some embodiments, the controller program operating at the client system may reduce latency between the network element and the controller services. For example, the client computing device may be physically closer to the network element than the service provider system, may experience fewer hops in the network, etc. Additionally or alternatively, the client computing device may have a stronger network connection (e.g., bandwidth, signal strength, etc.) to the network element than the service provider system.

At block 570, the service provider system may receive confirmation that the client computing device is running the controller program. For example, the client computing device may execute the controller program, and after the controller program has completed initializing, the controller program may cause the client computing device to transmit a confirmation message to the service provider system that the controller program is functioning correctly. In some embodiments, the service provider system may provide details and/or other requirements for the controller program in response to the confirmation message, such as to which network elements the controller program is to provide controller services, etc.

At block 580, the service provider system may shut down the controller program operating at the service provider system. For example, after confirmation that the controller program operating at the client computing device is providing controller services to the network element of the client system, the service provider system may shut down a service provider system controller program that previously provided controller services to the network element. Shutting down the servicer provider system controller program may reduce a load of the service provider system. For example, by reducing the number of controllers operating in a pool of controllers, the hardware operating the pool of controllers may have a reduced load.

Accordingly, the method 500 may utilize distributed controllers. Modifications, additions, or omissions may be made to the method 500 without departing from the scope of the present disclosure. For example, any of the blocks 510, 520, 530, 540, 550, 560, 570, and/or 580 may be omitted. As another example, the operations of the method 500 may be implemented in differing order. For example, the blocks 520, 530, and/or 540 may be performed in any order. Additionally or alternatively, two or more operations may be performed at the same time. For example, the blocks 520, 530, and/or 540 may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 6A:
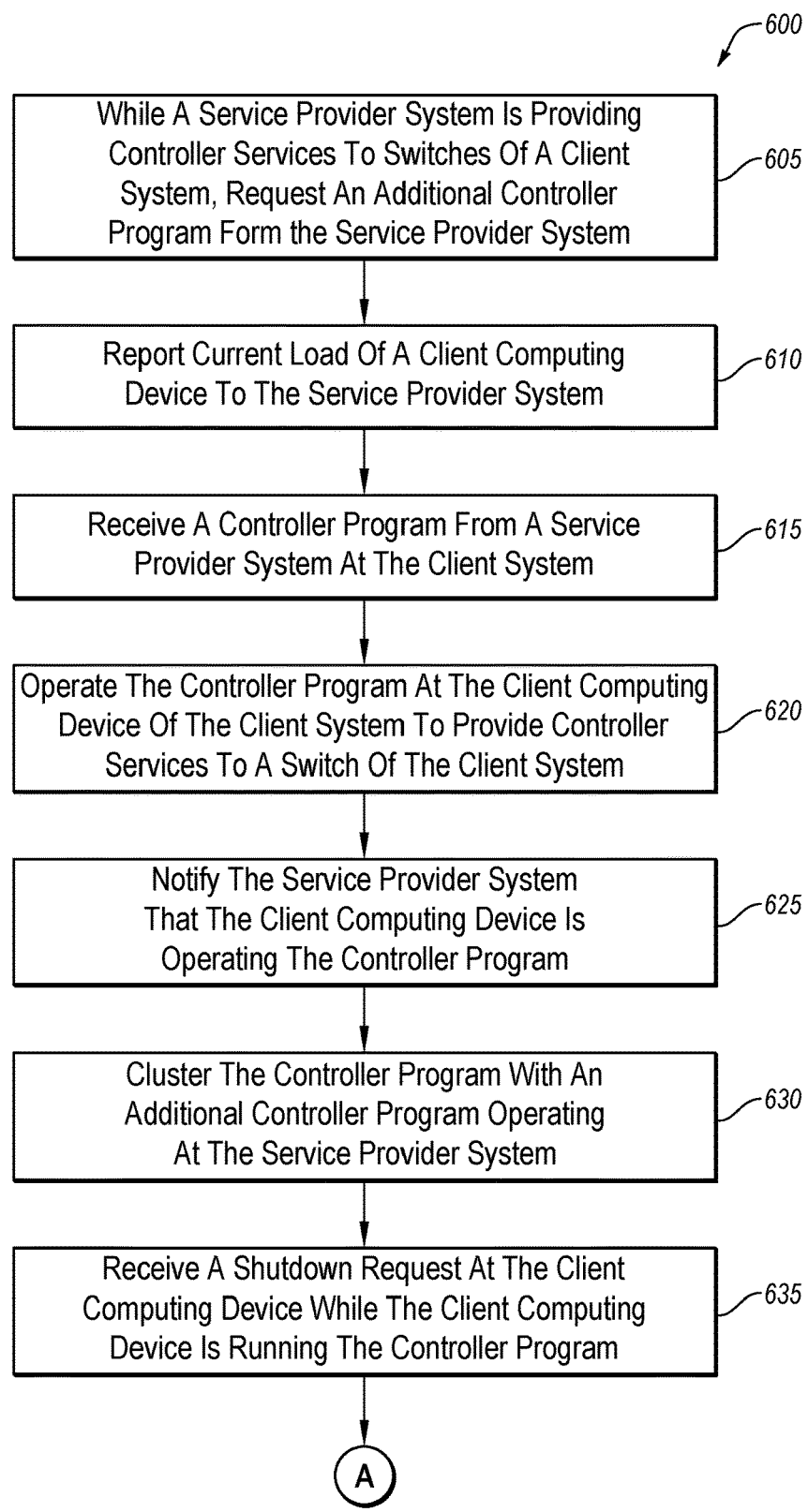
FIGS. 6A and 6B are a flow chart of an additional example method utilizing distributed controllers.
Figure 6B:
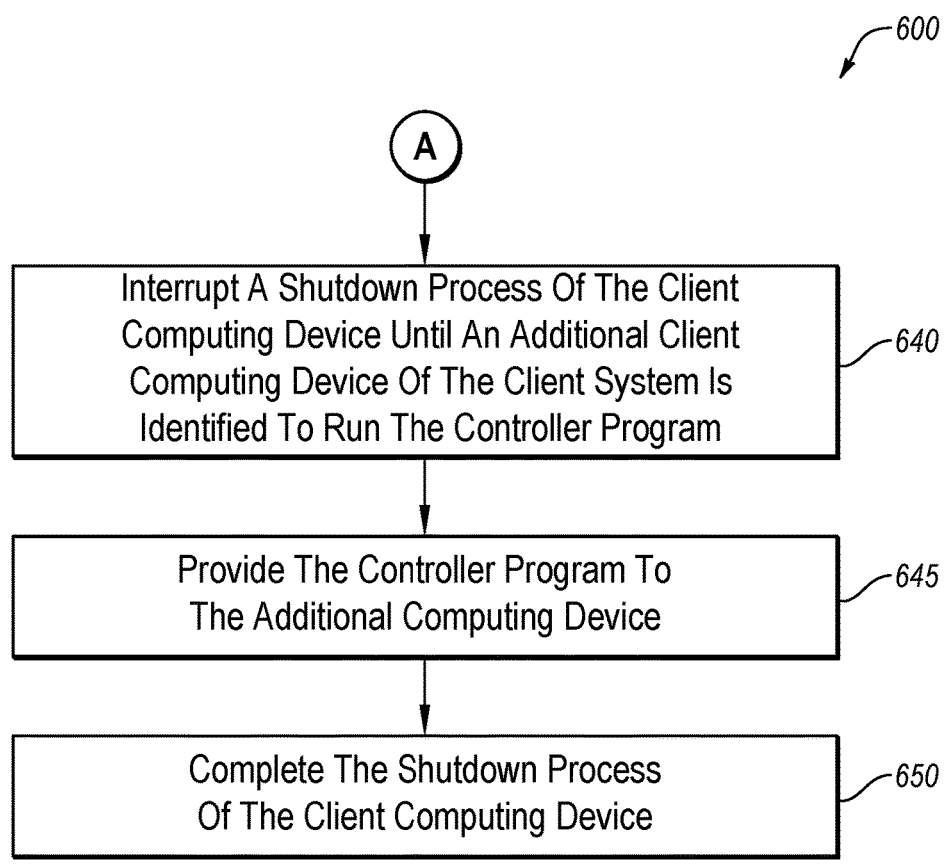

FIGS. 6A and 6B are a flow chart of an additional example method 600 utilizing distributed controllers, in accordance with at least one embodiment of the present disclosure. The method 600 may be performed by any suitable system, apparatus, or device. For example, the system 100 of FIG. 1 and/or the computing device 300 of FIG. 3 may perform one or more of the operations associated with the method 600. Although illustrated with discrete blocks, the steps and operations associated with one or more of the blocks of the method 600 may be divided into additional blocks, combined into fewer blocks, or eliminated, depending on the desired implementation.

At block 605, while a service provider system (e.g., the service provider system 110 of FIG. 1) is providing controller services to one or more network elements (e.g., the network elements 124 of FIG. 1) of a client system (e.g., the client system 120 of FIG. 1), the client system may request an additional controller program from the service provider system. For example, the client system may have a contract to receive controller services from the service provider system. The client system may decide to add additional network elements and so may request an additional controller program from the service provider system to service the additional network elements. As another example, if a network (e.g., the network 128) serviced by the network elements is running slowly or experiencing lag, the client system may request additional controller programs to provide better service to the network elements.

At block 610, the client system may report a current load of a client computing device (e.g., the client computing devices 122a and/or 122b of FIG. 1) to the service provider system. For example, a portal (e.g., the portal 112 of FIG. 1) may request that the client system provide the current load of one or more of the computing devices operating at the client system. In response, the client system may report the load (e.g., a processor load, a memory load, a network load, etc.) of the computing devices to the service provider system.

At block 615, the client system may receive a controller program (e.g., the controller program 116 of FIG. 1) from the service provider system. For example, the portal of the service provider system may transmit an executable file of the controller program from the portal to the client computing device.

At block 620, the client system may operate the controller program at the client computing device to provide controller services to at least one of the network elements of the client system. For example, in response to receiving the controller program or in response to a request from the service provider system, the client computing device may execute the controller program.

At block 625, the client system may notify the service provider system that the client computing device is operating the controller program. For example, at or near the end of the initialization sequence of the controller program, the controller program may instruct the client computing device to report to the service provider system that the client computing device has executed the controller program successfully and is providing controller services to at least one of the network elements. As another example, after the controller program is operating on the client computing device, the same or another device of the client system may send a notification to the service provider system that the controller program is providing controller services to the network element.

At block 630, the controller program, operated by the client computing device, may be clustered with an additional controller program operating at the service provider system. For example, the controller program may interface with, communicate with, and/or otherwise function as a member of a pool of controllers operating at the service provider system (e.g., the pool of controllers 114 of FIG. 1).

At block 635, a shutdown request may be received at the client computing device while the client computing device is running the controller program. For example, a user of the client computing device may request or initialize a shutdown procedure to reduce or eliminate power to the client computing device.

At block 640 (illustrated on FIG. 6B), the shutdown process of the client computing device may be interrupted until an additional client computing device of the client system may be identified to run the controller program. For example, the shutdown process may be placed on hold while the client system and/or the service provider system identifies and/or selects additional computing devices that may have the computing resources available to operate the controller program.

At block 645, the controller program may be provided to the additional client computing device. For example, the client computing device may transmit or otherwise pass the executable file for the controller program to the additional client computing device. As another example, the client computing device may take a snapshot or otherwise suspend the controller program and may transmit or otherwise pass the snapshot or suspended version of the controller program to the additional client computing device. For example, the physical memory location of the client computing device implementing the controller program may be suspended, copied, and transmitted to the additional client computing device. As an additional example, the service provider system may transmit the controller program to the additional client computing device.

At block 650, the client computing device may complete the shutdown process. For example, after confirming that the additional client computing device is running the controller program, the client computing device may complete any remaining tasks in the shutdown process and may then reduce or remove power to the client computing device.

Accordingly, the method 600 may utilize distributed controllers. Modifications, additions, or omissions may be made to the method 600 without departing from the scope of the present disclosure. For example, any of the blocks 605, 610, 625, 630, 635, 640, 645, and/or 650 may be omitted. As another example, the operations of the method 600 may be implemented in differing order. For example, any of the blocks 605, 610, and/or 615 may be performed in any order. Additionally or alternatively, any of the blocks 625, 630, and/or 635 may be performed in any order. Additionally or alternatively, two or more operations may be performed at the same time. For example, any of the blocks 620, 625, 630, and/or 635 may be performed at the same time. As another example, any of the blocks 605, 610, and/or 615 may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Embodiments within the scope of the technology disclosed herein may also include computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing device" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   determining latency between a client system and a service provider system, the client system including a network element and a client computing device, the service provider system including and operating a controller program configured to provide controller services to the network element of the client system; and
   based on the latency being longer than a threshold, transmitting the controller program to the client computing device; and
   executing the controller program by the client computing device so that the client computing device provides controller services to the network element of the client system.

2. The method of claim 1, wherein the determining latency between a client system and a service provider system includes measuring latency between a service provider computer of the service provider system running the controller program and the network element.

3. The method of claim 1, wherein the determining latency between a client system and a service provider system includes measuring latency between a portal of the service provider system and the client computing device.

4. The method of claim 1, wherein the determining latency between a client system and a service provider system includes measuring latency between a service provider computer of the service provider system running the controller program and the client computing device.

5. The method of claim 1, wherein the determining latency between a client system and a service provider system includes measuring latency between a portal of the service provider system and the network element.

6. The method of claim 1, wherein the transmitting the controller program is additionally based on one or more of a memory burden of the client computing device based on memory usage of the controller program, a storage burden of the client computing device based on volume of storage used by the controller program, and a processing burden of the client computing device based on processor utilization of the controller program.

7. The method of claim 1, further comprising:
   identifying one or more computing devices currently operating at the client system, the one or more computing devices including the client computing device;
   selecting the client computing device, from among the one or more computing devices, to run the controller program;
   requesting the client computing device to run the controller program;
   receiving confirmation that the client computing device is running the controller program; and
   shutting down the controller program at the service provider system.

8. The method of claim 1, further comprising receiving authentication of a user operating the client computing device prior to transmitting the controller program to the client computing device.

* * * * *